United States Patent

Raynes

[15] 3,685,022

[45] Aug. 15, 1972

[54] NUMERICAL CONTROL MACHINING APPARATUS PROGRAMMED FOR FAMILIES OF CUTTER SIZES

[72] Inventor: Burt F. Raynes, Chula Vista, Calif.

[73] Assignee: Rohr Corporation, Chula Vista, Calif.

[22] Filed: July 27, 1970

[21] Appl. No.: 58,274

[52] U.S. Cl. ..................340/172.5, 408/3, 318/572, 235/151.11
[51] Int. Cl. ..............................................G05b 9/00
[58] Field of Search ...........340/172.5; 318/567, 572; 235/151.11; 408/3

[56] References Cited

UNITED STATES PATENTS

| | | | |
|---|---|---|---|
| 3,439,346 | 4/1969 | McGee | 340/172.5 |
| 2,917,693 | 12/1959 | Call | 318/572 |
| 2,933,244 | 4/1960 | Tripp | 318/572 X |
| 3,148,317 | 9/1964 | Tripp | 235/151.11 X |
| 3,246,129 | 4/1966 | McKelvie | 235/151.11 X |
| 3,270,186 | 8/1966 | Centner | 235/151.11 |
| 3,340,447 | 9/1967 | MacDonald | 318/572 X |
| 3,430,035 | 2/1969 | Read | 235/151.11 |
| 3,449,554 | 6/1969 | Kelling | 235/151.11 |
| 3,500,150 | 3/1970 | Foster | 235/151.11 X |
| 3,515,964 | 6/1970 | Okamoto et al. | 318/572 |

OTHER PUBLICATIONS

Wortzman, D., " Cutter Compensation in Numerical Control" In IBM Technical Disclosure Bulletin; Vol. 12, No. 1, June 1969; pp. 152- 155.

*Primary Examiner*—Paul J. Henon
*Assistant Examiner*—Melvin B. Chapnick
*Attorney*—George E. Pearson

[57] ABSTRACT

For each successive workpiece operation to be performed by a numerical control machine, the operator selects an available one of a family of full and undersized cutters and, by actuation of a corresponding console switch, causes a programmed tape to be scanned and appropriately positioned to provide a matching program for use with the selected cutter. Circuit logic set up in response to actuation of the switch prevents starting of the numerical control machining until the matching program is in the starting position on the program reader. For each operation there is a family of full sized cutter having a tool code identification T-01 and undersized cutters having tool code identifications T-02 to T-04, respectively. The programmed tape has recorded thereon for each operation, a sequence of programs, there being one program for each cutter size of the family of cutter sizes for that program. Each program includes the dimensional instructions for its cutter size together with the T-code identification of the cutter size. The programs for each family of cutter sizes and the families of programs for the sequence of machine operations are all recorded on the single tape in uninterrupted sequence thereon. There is one console selector switch for each of the full and undersized cutters in the family of cutters, and actuation of any one permits the tape scanning operation to begin upon actuation of a "SCAN" switch. An "ON-OFF" console switch provides for bypass of the selector switch operation to permit scanning of uncoded tapes. The T-code identification of the selected cutter and the T-code identification of the corresponding program positioned at the program reader are visually indicated.

24 Claims, 9 Drawing Figures

FIG. 1

INVENTOR
BURT F. RAYNES

INVENTOR.
BURT F. RAYNES
BY
ATTORNEY

FIG. 6a

INVENTOR
BURT F. RAYNES

NUMERICAL CONTROL MACHINING APPARATUS PROGRAMMED FOR FAMILIES OF CUTTER SIZES

BACKGROUND OF THE INVENTION

In recent years, numerical control methods have become especially valuable in machining intricate parts. Prior to the discovery of this invention, it was customary to provide the dimensional instructions to a numerically controlled machine tool such, for example, as a mill, in the form of a complete set of instructions, referred to as the "program." The program was divided into segments of instructions which required the same set-up procedures such, for example, as tool type, spindle speed, part position, etc.

Each program segment was referred to as an "operation" and given an operation number. The machine tool operator was given a book of these set-up instructions for each program. Typically, the set-up requirements for each operation were contained on a single page of this book. All operations required to produced a given part were recorded in the sequence of their use on a single tape, there typically being five or more such operations.

In a typical milling operation, the program would instruct the milling tool to perform a specified number of rotations in addition to rectilinear horizontal and vertical movements, and it was most often convenient to program movement of the tool in terms of the motion of its center line relative to the workpiece. The creation of the dimensional instructions for each operation was therefore based on the desired cutter path as determined by the centerline of the cutter, and the diameter of the cutter became a constant in the computation of the dimensions. All such programs thus were initially produced on the assumption that a full size, that is, a new and unworn cutter would be used.

When a cutter was re-ground, that is, r-sharpened after use, however, its diameter became something less than its dimension which was used as a constant in the original program computations, and a new program was necessarily issued with the dimensional data altered to reflect the change in the constant in order to maintain the required tolerances on the part to be produced.

Thus, in accordance with the aforedescribed milling procedure, all previous recordings of an operation became void for use with a cutter each time the same was re-sharpened, and for each new operation it became necessary to match each available re-ground tool with the properly dimensioned tape for use with it. Since each new operation usually required a tool change, the changing of tapes became a time consuming operation and introduced the possibility of program-cutter mis-match with resultant scrapping of parts. Thus, the major difficulty in using a multiplicity of tools and a corresponding multiplicity of programmed tapes, as in the prior art method, is that, through human error, a selected program could be mismatched with the selected cutter. After a number of operations had been performed upon a part, the commercial value of the same could have become rather high, and an error in tool size in a single successive operation, could render such a part completely worthless.

It would thus be advantageous to have a numerical control machining method and apparatus for producing parts with resharpened tools, that would be low in cost, that would reduce the problems of human error, and that would reduce the operator time in producing the part.

SUMMARY OF THE INVENTION

The invention relates to numerical control machining and more particularly to improvements therein which promote the use of re-sharpened cutters.

In accordance with this invention, tools are ground to selected undersize dimensions such as −0.010 inch for the first re-sharpening; −0.020 inch for the second; −0.030 inch for the third; −0.040 inch for the fourth; etc. At conception of the programming process, the dimensioned instructions for each operation are computed for each full and undersized cutter. Each cutter size variation of each operation is identified by an approved EIA (Electronics Industries Association) code designation such, for example, as the letter T. Thus, as employed herein, T–01 designates the full size cutter; T–02 the minus then thousandths inch undersize cutter; - - - ; T–05 the minus forty thousandths inch cutter; etc.

All cutter size variations and their code identifications for each operation, that is, the family of programs for the family of full and undersize cutters are recorded in sequence on a single tape along with the other families of programs for the other operations, the families of programs for the respective operations being recorded on the tape in the sequence of their use in accordance with the sequence of the operations to be performed upon the workpiece. The T code identifications assigned to each cutter size variation for each operation are included in the set-up instructions furnished to the machine tool operator who, when setting up for a given operation, determines what cutter of the type specified is available and matches its diameter to a T identification code set forth on the page of the set-up book relating to that operation. The operator then depresses a switch on the machine console having a T identification code which corresponds to that of the selected cutter, there being one such switch for each full and undersize cutter in the family of cutters.

The console code switches are components of the program selector control system which causes the tape to be scanned to locate the program which matches the selected cutter for the specified operation. Actuation of any of the code switches sets a control memory device that permits the scanning operation to begin upon request. Unless a code switch has been actuated, that is, a selection made, automatic operation of the selector control is not permitted because of an interlock which is effected. However, an ON-OFF console switch is provided to bypass this interlock to allow tapes to be used which have not been coded for operation in the manner of the present invention.

On operation of the "SCAN" switch, the tape reader is started. The tape recorded identifying codes of each operation are detected, decoded, and stored in memory units. As each new identification is read in, the previous memory is erased, only one memory unit being active at any time. The activated memory unit indicates which operation code is currently passing the reading head.

At the start of the scan operation, all codes are read and stored briefly but otherwise ignored. When a T–01 code is detected, the selector control system is alerted to the fact that a new family of cutter size programs for a new, that is, successive operation is in position to be scanned. This condition of the tape position at the reader corresponds to the turning of the page of the machine operator's instruction book which means that a new and successive operation is to be performed on the workpiece.

Upon detection of the T–01 code for the new operation, a comparison logic of the selector control system is activated so that each identification code, as soon as it is read, is compared to the control memory which was set by actuation of the selected tool code switch. On detecting a comparison, the reader is stopped with the dimensional instructions of the program appropriate for use with the selected tool in position on the tape deck for reading, and accordingly, a signal is sent to the main numerical control system to qualify start of the automatic cycle of machining operations. At the end of the automatic cycle, the selected tool memory is cleared, and this prevents start of a subsequent automatic cycle until a new tool code selection has been made.

Other objects, features, and advantages of the invention, not hereinbefore set forth nor implied, will become more clearly apparent from the following detailed description of the best mode thus far devised for embodying the principles of the invention, reference being had to the accompanying drawings wherein:

BRIEF DESCRIPTION OF THE DRAWINGS

FIG. 2b is an elevational showing of the tool-workpiece relationship depicted in FIG. 2a;

Figure 1:
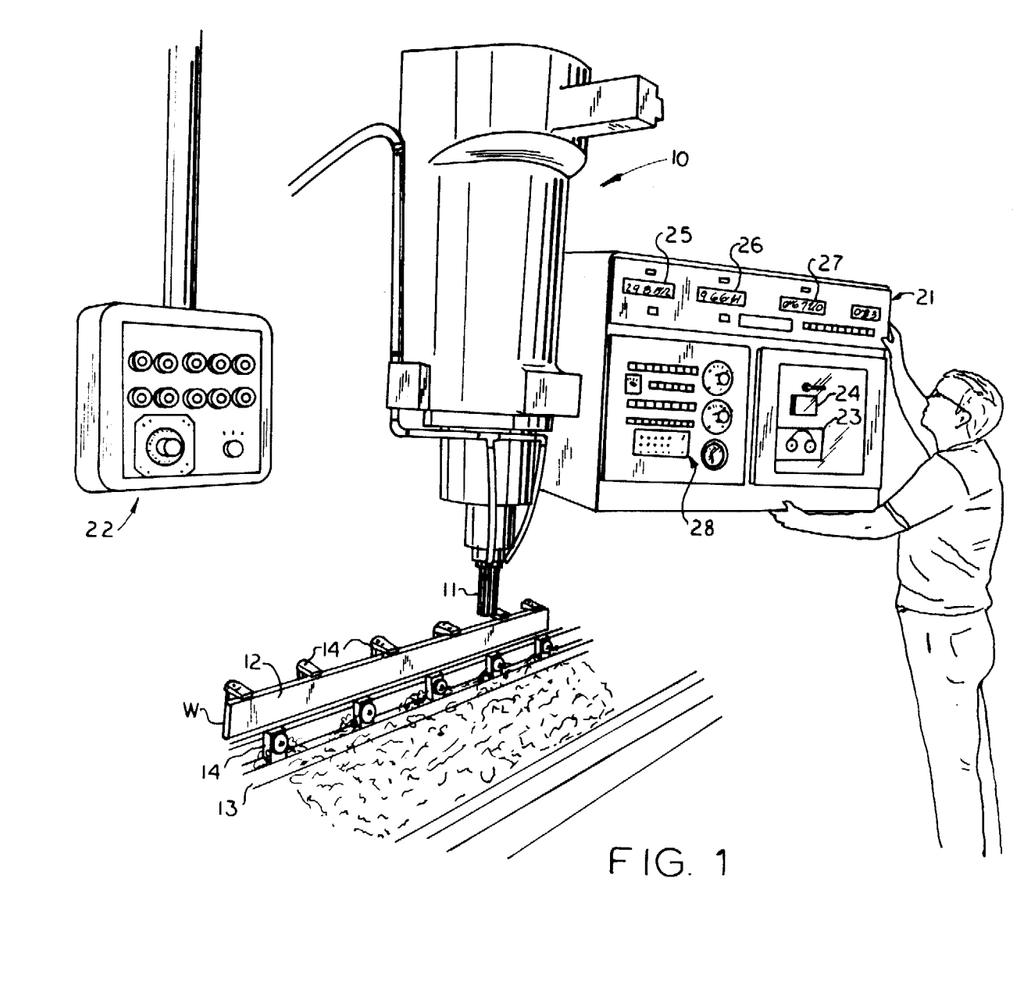
FIG. 1 is a pictorial view of a milling machine having the tool code selector control system of the present invention.

Referring now to the drawings, and first more particularly to FIG. 1 thereof, a numerically controlled milling machine generally designated 10 rotates a cutter 11 and positions the same in cutting relation to the surface 12, for example, of a workpiece W which is secured in position on the machine table by a jig 13 having a plurality of clamps 14 for holding the workpiece.

Figure 2A:
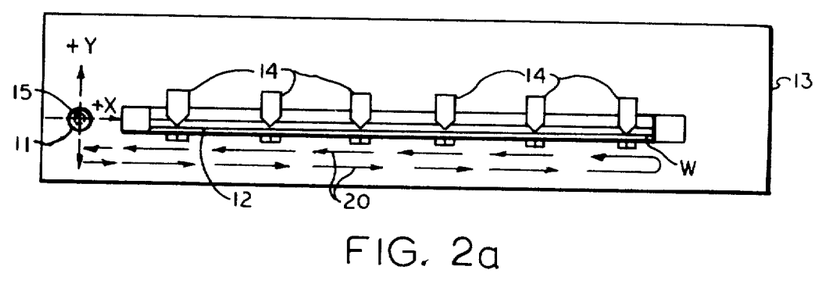
FIG. 2a is a plan view providing a schematic representation of the tool-workpiece relationship in terms of the centerline of the cutter.
Figure 2B:
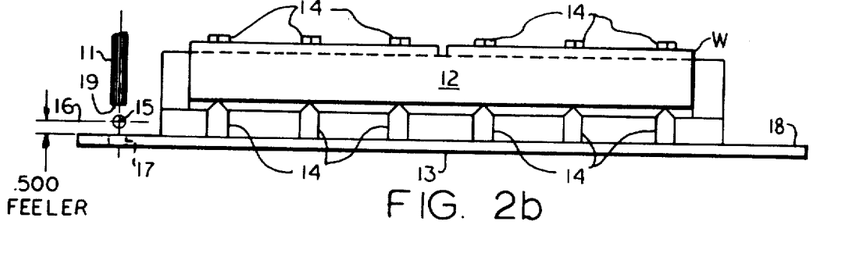

FIGS. 2a and 2b disclose the jig set up as it appears on the machine tool operator's numerical control set up document sheet, which sheet provides the necessary instructions to the operator for performing a particular operation on workpiece W by machine tool 11. This sheet along with other sheets providing similar instructions for performing additional operations on the workpiece are furnished to the operator in book form to thus cover all of the operations to be performed on workpiece W. As each operation is completed, the operator turns the page of the completed operation to present the page of the new operation to be performed.

Among other instructions in addition to the showings of FIGS. 2a and 2b, the document sheet gives the operator the size of the tool including its diameter, length and tolerance, and the family of cutter sizes that may be used for the operation, such as T–01, full size; T–02, –0.010 inch undersize; T–03, –0.020 inch undersize; T–04, –0.030 inch undersize; T–05, –0.040 inch, undersize. The operator determines which cutter size is available, and then positions the available cutter on the machine spindle, this being the tool 11, as shown in FIGS. 1 and 2b.

The jig is positioned on the machine table so that the centerline of the tool coincides with a locating point 15, FIGS. 2a and 2b, disposed within a plane 16, FIG. 2b, perpendicular to the centerline of the tool. To accomplish this, the machine head is moved to position tool 11 in the reference hole 17, FIG. 2b, provided in the jig so that the bottom end face 19, FIG. 2b, of the tool is disposed within the plane 16. As instructed by his document sheet, the operator positions the tool, as thus required, by inserting a 0.500 feeler gage between the jig surfaces 18 and the tool end face 19.

With reference to FIG. 2a, the arrows associated with the X and Y coordinates on the document sheet instruct the operator that the machine "table" and "saddle" movements, respectively, will be in these directions relative to the centerline of cutter 11, and that the machine "head" movements will be along the centerline, FIG. 2b, of the cutter. The document sheet will further instruct the operator regarding the nature of the cutting operation, i.e., whether "rough," "finish," etc., and that the cut traverse will be along the arrows 20.

Cutter 11 is rotated and positioned relative to the workpiece by the machine controls generally designated 21 and 22, FIG. 1, the tool being directed in relation to the workpiece in accordance with dimensioned instructions recorded on a suitable recording medium such, for example, as a magnetic tape (not shown) carried by the cartridge type tape deck 23 and moved thereby in scanning relation to the cartridge reader 24. The instantaneous positions of the tool relative to the workpiece are visually indicated by the readout type indicators 25, 26, and 27 which respectively indicate the "table," "saddle," and "head" positions of the machine relative to the tool centerline, as aforedescribed. When these indicators read zero, the tool will be positioned at the initial reference position 15, FIGS. 2a and b. The tape instructions, then, at the start of each new operation to be performed on the workpiece, will first proceed to direct and move the tool from this reference position into engagement with the workpiece. As shown in FIG. 1, the tool is in a position of disengagement from the workpiece.

Figure 3:
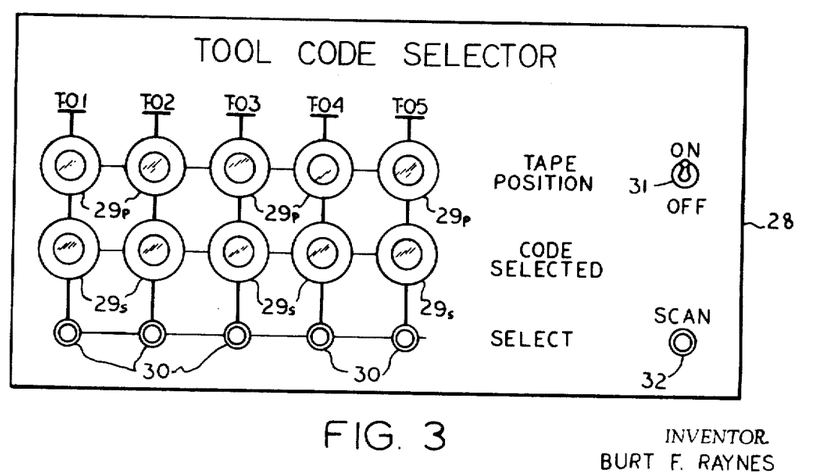
FIG. 3 is an enlarged view of the tool code selector console panel.

In addition to other console controls requiring manipulation by the machine tool operator to initiate numerical control operation of the milling machine 10, there are also provided for purposes of the present invention, a plurality of switches provided on the tool code selector panel generally designated 28, reference now being directed to FIG. 3 for a specific description of these selector controls.

Referring to FIG. 3, the tool code selector panel 28 presents a plurality of indicator lamps 29s and 29p of which there is a pair (s and p) for each of tool codes T–01 to T–05. Lamps 29p in the upper row of lamps are employed to indicate the position of the tape relative to the reader 24, FIG. 1, these lamps being lighted individually as their corresponding code identifications recorded on the tape are brought into position to be read by the reader. Lamps 29s in the lower row of lamps are associated with the code select switches 30, there being one such switch for each lamp in this lower row. Switches 30 are of the push button, momentary contact type which remain actuated only as long as the same are depressed. When a particular switch is actuated momentarily, its associated lamp in the lower row of lamps is lighted. If tool 11 was identified and selected by the operator as being T–02, for example, he would have depressed the T–02 switch button on selector panel 28 which would have caused the lower T–02 lamp 29s to light. Until the appropriate program for the T–02 tool selection had been positioned at reader 24 and the machining operation using that program had been completed, the T–02 switch selection indicator lamp 29s would remain lighted by means of a memory device, hereinafter to be described. Until the operation is completed by the selected tool 11, the assumed T–02 tape position indicator lamp 29s would remain lighted under control of a memory device, hereinafter to be described. Upon completion of the operation, the T–03 program for that operation would then be in position at reader 24 and its corresponding position lamp 29p would be lighted and would remain lighted until a new switch selection had been made and the tape had been moved, as hereinafter to be described.

The on-off switch 31, as will more fully appear as the description proceeds, is a single pole, single throw switch which is used to bypass the selector controls so that scanning of an un-coded tape can be effected even through a selection has not been made by actuating one of the switches 30. Scanning is accomplished by depressing the scan switch 32 which is a normally open, momentary contact type switch which is closed only so long as it remains depressed.

Upon actuation of one of selector switches 30, followed by a momentary depressing of the scan switch 32, tape reader 24 becomes actuated to scan the tape, and when the tape becomes so positioned that the selected code is read by the reader, both lamps 29s and 29p associated with the assumed selected code T–02 become lighted, the reader is stopped, and start of the automatic numerical control cycle is qualified, all as will more fully appear as the description proceeds.

Figure 4:
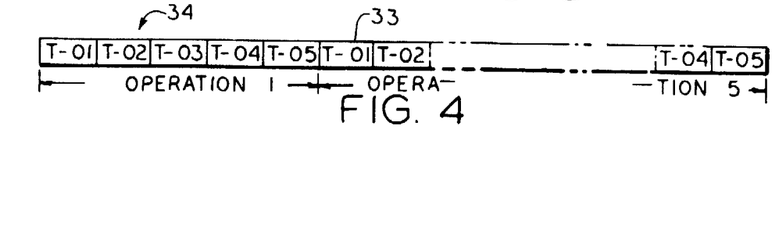
FIG. 4 is a schematic view of the programmed tape used with the present invention.

The programmed tape for the numerical control machining of workpiece W, referred to hereinbefore in reference to the tape deck 23 and reader 24 of FIG. 1, is disclosed schematically in FIG. 4 and designated generally therein by the numeral 33. It will be recalled that the operator's document sheet (page), referred to in connection with FIGS. 2a and b, made reference to five cutter sizes and, also, that the tool code selector panel 28 displayed five code selections corresponding to these cutter sizes. It will be recalled also that the operator's book for machining workpiece W included as many such pages as there were operations to be performed on the workpiece. Assuming that the page pertaining to FIGS. 2a and 2b was for the first operation to be performed on workpiece W and that there were five such operations to be performed in all, the serial recording on tape 33 of the various programs required for the five operations would be as depicted in FIG. 4. The arrow 34 indicates that the program selected for OPERATION 1 was the aforementioned T–02 code program.

For each of the five operations, a program is recorded for each of the five possible tool sizes which conceivably might be used. Thus for the first operation (OPERATION 1), five programs, T–01 to T–05, are recorded serially on tape 33 to provide appropriate dimensioned instructions for machining workpiece W with any one of a family of full and undersize cutters, T–01 to T–05, which cutters all have the same nominal diameter and any one of which, when used with its corresponding program, would be suitable for use in machining the first operation on workpiece W. Tape 33 is similarly programmed for each of the other four operations to be performed on workpiece W, there being recorded on tape 33 for each of these operations a family of programs, T–01 to T–05, corresponding to the family of cutters, T–01 to T–05, all of which cutters have the same nominal diameter and any one of which could be used to perform the operation. Thus, all of the programs covering a book of operations for machining the workpiece W, and permitting use selectively of one of five cutter sizes for each operation, are recorded on the single tape 33.

In order to minimize logic circuitry and the operator's controls, similar tool codes are used for each operation. For example, the same T–03 tool code may identify a particular size tool and its corresponding program suitable for performing the first operation on workpiece W and also identify a different size tool and its corresponding program suitable for performing the second operation on workpiece W. Thus, assuming the operator has completed the first operation, as depicted on tape 33, FIG. 4, with a tool and program identified as T–02, assume further that the second operation is to be performed with a tool and program identified as the T–03 code. Since the families of tool code programs for all of the operations are recorded in sequence on the tape, following completion of the first operation with the T–02 code tool, the T–03 program will appear at the reader, but this will be a member of the first operation family of tool code programs, whereas the T–03 program from the second operation family of tool code programs is the required program. Accordingly, means are provided in the logic diagram hereinafter to be described for advancing the tape beyond the first operation family of tool code programs and thence to the T–03 program in the second operation family of programs.

Tool codes are recorded on the tape at the beginning of each program so that the same may be identified. When tape reader 24, FIGS. 1 and 5, scans the tape cartridge 23, FIG. 1, the recordings of the tool codes are sensed thereby and signals supplied via line 99, FIG. 5, to the NC Machine Controls 21 where the signals are decoded and directed as inputs via line 108 to appropriate storage registers of a register bank 85, hereinafter to be described. The tool code of the first program of each family of tool code programs has a special utility inasmuch as it is utilized to identify the commencement at the reader of a new family of programs, all in a manner subsequently to be described.

Figure 5:
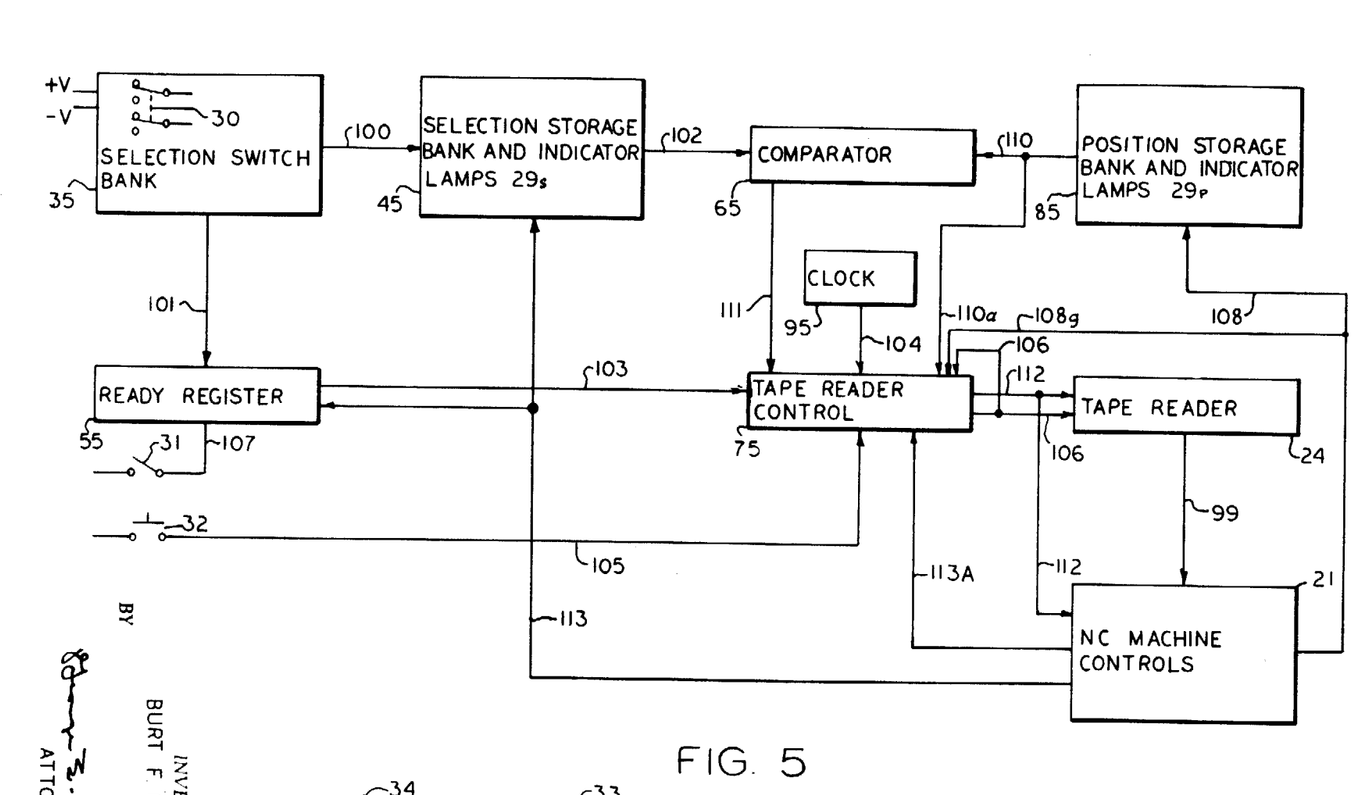
FIG. 5 is a block diagram of the selector control system.

The numerical control milling machine 10, FIG. 1, is operated, as aforementioned, on control signals supplied by numerical control machine controls 21, FIGS. 1 and 5, in response to signals received via line 99 from tape reader 24 which scans the tape and senses the binary dimensional instructions which have been programmed on the tape for operation of the machine, all in a conventional manner. This operation, however, cannot be started by the operator until the automatic numerical control cycle has been qualified by the selector control system as presently to be described.

Figures 6, 6B:
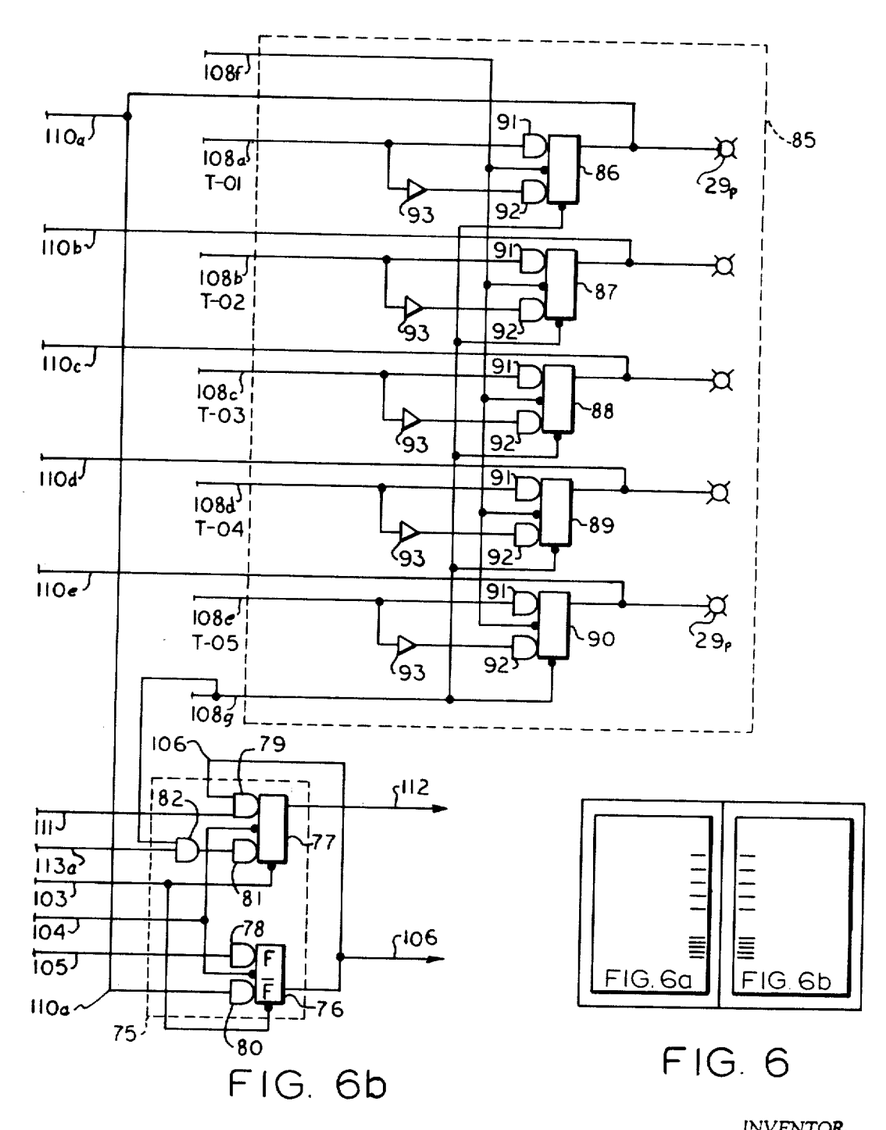
FIG. 6 is a diagrammatic view showing how the sheets upon which FIGS. 6a and 6b appear must be juxtapositioned to read their disclosed partial circuits as a complete circuit.
FIGS. 6a and 6b disclose the logic circuit diagram for the code selector system of the present invention.
Figure 6A:
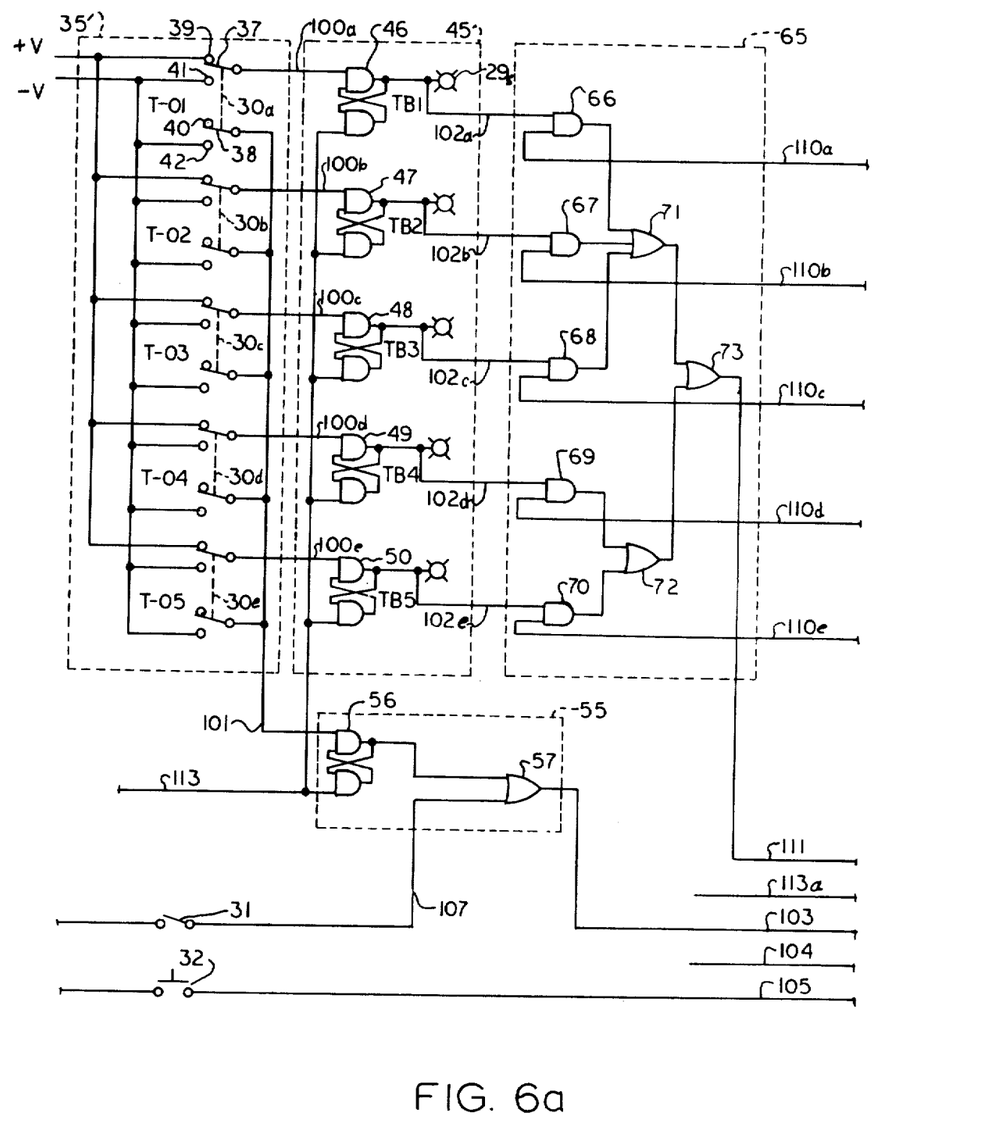

For operation of the code selector control system, FIGS. 5 and FIGS. 6a and 6b, voltages +V and −V are shown as delivering a potential to the selection switch bank 35 which comprises the aforementioned code select switches 30. It will be understood that voltages +V and −V represent lower and upper voltage levels, for example, and are shown only by way of example as an aid in following the flow of the logic circuit diagram, FIGS. 6a and 6b. It will be understood, moreover, that voltage +V is defined as being in the logical 0 state and voltage −V as being in the logical 1 state.

Whenever a tool code select switch 30, FIGS. 3, 5 and 6a, of selection switch bank 35 is depressed, inputs are supplied therefrom via line 100 to the selection storage bank and indicator lamps block 45 and via line 101 to ready register block 55. The input via line 100 causes the corresponding one of a bank of flip-flops 46 to 50, FIG. 6a, to be set, and the set flip-flop, in turn, lights its corresponding indicator lamp 29s and supplies a first input via line 102 to the corresponding one of a bank of AND gates 66 to 70 in comparator 65.

As best seen in FIG. 6a, the select switches 30 for tool codes T-01 to T-05 of selection switch bank 35 are identical, each switch 30 being of the momentary contact, push button type further characterized as double pole, single throw in which the ganged contact members 37 and 38 of each switch normally engage their respective back contacts 39 and 40 in the non-depressed state of the switch and engage their respective front contacts 41 and 42 in the depressed state of the switch. It will be understood that only one of switches 30 is depressed at any time and that the aforementioned line 100, FIG. 5, actually constitutes a plurality of lines 100a to 100e, FIG. 6a, which are connected between the contact members 37 of switches 30a to 30e and their corresponding flip-flop 46 to 50, respectively. Thus, in the depressed state of each of switches 30a to 30e, −V voltage on each of contacts 41 is applied by its corresponding contact member 37 to its corresponding one of flip-flops 46 to 50 to set the same and light its indicator lamp 29s, thereby indicating which code selection has been made.

The aforementioned input line 101 from selection switch bank 35 to ready register 55 is connected to each of the contact members 38 of switches 30a to 30e and, thus, when each of these switches is closed, −V potential is applied to line 101 by its contact member 38 in engagement with its contact 42, each of the contacts 42 being connected to −V voltage, as shown in FIG. 6a. The −V potential on line 101 sets flip-flop 56 of ready register 55 to thus remove by way of its connected OR gate 57 and line 103, FIGS. 6a and 6b, an asynchronous inhibiting low level 0 input to first and second synchronous shift registers 76 and 77 of tape reader control 75, FIG. 6b.

Synchronous shift registers 76 and 77 are of a commercially available type and are set by AND gates 78 and 79, respectively, and reset by AND gates 80 and 81, respectively. These qualifying inputs to each of registers 76 and 77 are gated by a clock pulse supplied thereto via line 104 from a clock 95, FIG. 5, which may be a suitable oscillator. Use of the clock pulses reduces the problem of spurious actuation of the shift registers in response to noise.

Register 76 is set when scan switch 32, FIGS. 3, 5 and 6a, is depressed at a time when the asynchronous inhibiting input on line 103 is removed, as aforementioned. An input from switch 32 via line 105, FIG. 5, and FIGS. 6a and b, to AND gate 78 is gated by a clock pulse on line 104 and this causes register 76 to be set to thus supply from its F̄ terminal a logic 0 output on line 106 which, as an input to tape reader 24, causes the same to start to scan the tape. When register 77 is set, a signal is supplied on its output line 112 to stop the tape.

It will be understood that the function of flip-flop 56 and OR gate 57 of ready register 55 is to supply a low level logical 0 input to line 103 to clamp shift register 76 of reader control 75 to the OFF state to prevent synchronous operation thereof and resultant scanning operation of reader 24 until a tool code selection has been made by depressing one of select switches 30a to 30e of selection switch bank 35. As aforementioned, an uncoded tape may be used. In such case, actuation of bypass switch 31, FIGS. 3, 5 and 6a, provides an input via line 107 to OR gate 57 of ready register 55 to thus bypass flip-flop 56 and remove the inhibiting input from line 103.

As the tape is scanned by reader 24, signals corresponding to the sensed and decoded tool codes recorded on the tape are supplied, as aforementioned, via line 108 to the position storage bank and indicator lamps block 85. These signals, of course, are received in successive order, there being only one such signal corresponding to one of the tool codes T-01 to T-05 supplied via line 108 at any time. Actually, as may best be seen in FIG. 6b, line 108 constitutes seven lines 108a to 108g of which five of the lines 108a to 108e respectively provide inputs to AND gates 91 of conventional synchronous shift registers 86 to 90, these registers each being driven by single input set and reset AND gates 91 and 92, respectively. An inverter 93 interconnects each reset AND gate 92 with the respective input lines 108a to 108e of shift registers 86 to 90. Since only one of lines 108a to 108e is receiving an input signal, logic 1, at any time, the other lines are at logic 0 and their respective inverters 93 thus supply logic 1 inputs to their respective reset AND gates 93 to thus reset their respective shift registers if the same had previously been set.

When shift registers 86 to 90 receive input code signals at their respective AND gates 91 via their respective lines 108a to 108e, these inputs are gated by a load signal supplied via the aforementioned line 108f during the transmission from tape reader 24 of each of the input code signals, thereby to set the register which receives such a gated input signal. When thus set, registers 86 to 90 provide an output signal to light their respective indicator lamps 29p, thereby indicating that a particular tool code program is being scanned and is in position at the reader. The output signals of the set registers 86 to 90 appear as inputs on line 110, FIG. 5, to comparator 65 and provide a second input to its aforementioned AND gates 66 to 70.

Actually, input lines 102 and 110, FIG. 5, to comparator 65 constitute lines 102a to 102e, FIG. 6a, and lines 110a to 110e, FIGS. 6a and b. When both first and second inputs are supplied by these lines to any one of AND gates 66 to 70 of comparator 65, a comparison is made, that is, a program corresponding to the depressed select switch has been brought into position at reader 24, and both corresponding indicator lamps 29s and 29p are lighted. When this occurs, the activated one of AND gates 66 to 70 passes a signal via OR gates 71 or 72, as the case may be, and OR gate 73, and thence by way of line 111, FIGS. 5, 6a and b, to AND gate 79 of shift register 77 of tape reader control 75. As shown OR gate 71 has three inputs, these being from AND gates 66 to 68, and OR gate 72 has two inputs, these being from AND gates 69 and 70 of comparator 65. OR gates 71 and 72, in turn, pass their outputs to OR gate 73. A five input OR gate could be substituted for OR gates 71 to 73.

The comparison output from comparator 65 via line 111 will not alone set shift register 77 since its set AND gate 79 has two inputs both of which must receive logic 1 inputs to set the register. The other input to AND gate 79 is received by way of line 106 which, when register 76 is set, operates reader 24 on a logic 0 input. This is the means of assuring that register 77 will not be set to stop the tape until a new family of tool codes appears at reader 24. Thus, for example, assume that the first operation has been completed using a T-02 tool and corresponding T-02 program, FIG. 4. Assume further that the next operation (Operation 2, FIG. 4) is to be performed using a T-03 tool and corresponding T-03 program. The next program for the first operation, namely, a T-03 program, however, will be in position at reader 24, and the T-03 position lamp 29p will be lighted. When the T-03 switch selection for operation 2 is made by depressing switch 30c, the T-03 lamp 29s will light, and the second input to AND gate 68 will be supplied via line 102c. A comparison will be made, and a second logic 1 input will be supplied on line 111 to AND gate 79 of register 77, a first logic 1 input having been supplied thereto via line 106 because register 76 will be in its OFF state and the tape stopped, the "-SCAN" switch not having yet been depressed. Although a stop signal now appears on line 112, it has no significance because the tape is already in its stopped condition.

Any of the various manual control tape reader switches for moving the tape such, for example, as scan switch 32, when operated, will cause the tape to be moved from the assumed stop position in which program T-03 for operation 1 is in position at reader 24. Thus, when scan switch 32 is depressed momentarily after making the T-03 selection for operation 2, scanning of the tape will begin, as aforedescribed, and a 0 input on line 106 will be supplied to AND gate 79.

Upon initial movement of the tape, a pulse signal will be supplied on line 108g, FIGS. 5 and 6b, to the synchronous shift registers 86 to 90 of position storage bank 85 to thus turn off any of these registers which may be in the ON state. In the assumed example, T-03 register 88 is "ON" at the start of the tape movement and, accordingly, it is turned off and its associated lamp 29p is extinguished upon initial movement of the tape. The signal on line 108g is also supplied to the tape reader control 75 where it is applied as one of two inputs to OR gate 84. The output of OR gate 82 supplies the input to the aforementioned AND gate 81 for resetting synchronous register 77 which thus also becomes reset during the initial movement of the tape. Thus, notwithstanding that an operation 1, T-03 program was left in position at the reader at the time of selection of a T-03 tool for operation 2, and notwithstanding that a comparison was made upon registering this selection, register 77 nevertheless was rendered ineffective to stop the tape once it had been started. The tape would not again be stopped until a T-03 comparison had again been made upon the appearance of the operation 2, T-03 program at the reader, as will hereinafter be described in greater detail.

Assume that a T-04 rather than a T-03 tool had been selected for operation 2. As in the case of the assumed T-03 selection, upon initial scanning of the tape effected by depressing the T-04 switch 30d, the T-03 position lamp would become extinguished and the tape "STOP" register 77 would be reset by the appearance of the signal pulse on line 108g. Upon further movement of the tape, the operation 1, T-04 program would appear at the reader, the T-04 register 89 would become set and its associated lamp 29p would become lighted, a comparison would be made at comparator 65, and a logic 1 input would appear on line 111 at AND gate 79 for "STOP" register 77. However, line 106 to AND gate 79 would be supplying a logic 0 signal thereto. Thus, register 77 would not be set and the tape would not be stopped although a T-04 selection and tape position comparison had been made.

Returning to the assumed T-03 selection for operation 2, there would be no comparison made as the T-04 and T-05 programs appeared at the reader. Likewise, there would be no comparison made as the operation 2 programs T-01 and T-02 appeared at the reader at the start of these programs, and thus the tape would continue to move until a comparison was made as the operation 2, T-03 program appeared at the reader.

Although no comparison was made when the operation 2, T-01 program appeared at the reader because a T-03 and not a T-01 tool had been selected in the assumed example, nevertheless, a significant function occurred during the lighting of the T-01 position lamp 29p. When that occurred, the logic 1 signal on line 110a, FIGS. 5 and 6b, was applied to AND gate 80 of register 76 to thus reset register 76 of the tape reader control 75. Upon being reset, its output on line 106 was restored to logical 1 to thus provide a first logic 1 input to AND gate 79 so that thereafter, upon the T-03 comparison being made for operation 2, the appearance of the second logical 1 input on line 111 would cause register 77 to be set to thus stop the tape.

With the tape stopped in the operation 2, T-03 position, the tool code selector operation would be completed for the assumed T-03 example, that is, the assumed T-03 program would be positioned at the reader to match the T-03 cutter selected for machining the second operation. The signal on line 112, which stopped the tape, is also applied to the numerical control machine controls 21, FIGS. 1 and 5, to qualify the automatic numerical control cycle so that the same may be started by the operator by pressing a "START" button (not shown) which constitutes a part of these controls. A pulse developed in these controls and produced when the automatic cycle is started, is applied via line 113A as an input to tape reader control 75, FIGS. 5, 6a and 6b.

As best seen in FIG. 6b, the input on line 113A is applied to OR gate 82 to thus apply a signal to AND gate 81 of register 77 to reset the same when the input is gated by a clock pulse on line 104, as aforedescribed. Upon being reset, the logic 1 signal on the output line 112 of register 77 is removed, as aforementioned in connection with the input via line 108g to OR gate 82.

The T-03 switch and position lamps 29s and 29p will remain lighted during the machining operation of the assumed operation 2 example. At the completion of this assumed operation, and at the completion of each operation, reader 24 will read a clear memory code which is decoded to provide from machine controls 21 a signal which is supplied via line 113 therefrom to selection storage bank 45 and ready register 55, FIGS. 5 and 6a. As best seen in FIG. 6a, the signal on line 113 is applied to flip-flops 46 to 50 of selection bank 45 to reset the same and thereby extinguish their corresponding lamps 29s and remove any inputs to their corresponding AND gates 66 to 70 of comparator 65. The signal on line 113 is also applied to flip-flop 56 of ready register 55 to reset the same and thus clamp registers 76 and 77 in the O or OFF state, as aforedescribed.

Upon completion of operation 2 from program T-03, the T-04 program for operation 2 will appear at reader 24. When this occurs, the logic 1 appearing at the output of invertor 93 and input of AND gate 92 for the T-03 register 88 will cause the register to be reset and its corresponding lamp 29p will extinguish. The T-04 register 89, however, will be set and its 29p lamp will be lighted. The code selector system will then be in readiness to match the operation 3 program to the selected cutter tool T-01 to T-05, whatever the selection may turn out to be.

The aforedescribed operation 2, T-03 example will be summarized in relation to the following logic chart wherein the successive steps A to K depict the logical states of certain depicted ones of the lines in the logic flow diagrams, FIGS. 5 and 6a and b, at different times before and after the momentary depression of the assumed T-03 switch 30c for the second operation (OPERATION 2) following the assumed use of a T-02 tool for the first operation (OPERATION 1).

Logic Chart

Steps

| LINES | | A | B | C | D | E | F | G | H | I | J | K | A |
|---|---|---|---|---|---|---|---|---|---|---|---|---|---|
| 100 | a | 0 | 0 | 0 | 0 | 0 | 0 | 0 | 0 | 0 | 0 | 0 | 0 |
| | b | 0 | 0 | 0 | 0 | 0 | 0 | 0 | 0 | 0 | 0 | 0 | 0 |
| | c | 0 | 1 | 0 | 0 | 0 | 0 | 0 | 0 | 0 | 0 | 0 | 0 |
| | d | 0 | 0 | 0 | 0 | 0 | 0 | 0 | 0 | 0 | 0 | 0 | 0 |
| | e | 0 | 0 | 0 | 0 | 0 | 0 | 0 | 0 | 0 | 0 | 0 | 0 |
| 101 | | 0 | 1 | 0 | 0 | 0 | 0 | 0 | 0 | 0 | 0 | 0 | 0 |
| 102 | a | 0 | 0 | 0 | 0 | 0 | 0 | 0 | 0 | 0 | 0 | 0 | 0 |
| | b | 0 | 0 | 0 | 0 | 0 | 0 | 0 | 0 | 0 | 0 | 0 | 0 |
| | c | 0 | 1 | 1 | 1 | 1 | 1 | 1 | 1 | 1 | 1 | 0 | 0 |
| | d | 0 | 0 | 0 | 0 | 0 | 0 | 0 | 0 | 0 | 0 | 0 | 0 |
| | e | 0 | 0 | 0 | 0 | 0 | 0 | 0 | 0 | 0 | 0 | 0 | 0 |
| 103 | | 0 | 1 | 1 | 1 | 1 | 1 | 1 | 1 | 1 | 1 | 0 | 0 |
| 105 | | 0 | 0 | 1 | 0 | 0 | 0 | 0 | 0 | 0 | 0 | 0 | 0 |
| 106 | | 1 | 1 | 0 | 0 | 0 | 0 | 1 | 1 | 1 | 1 | 1 | 1 |
| | a | 0 | 0 | 0 | 0 | 0 | 0 | 1 | 0 | 0 | 0 | 0 | 0 |
| | b | 0 | 0 | 0 | 0 | 0 | 0 | 0 | 1 | 0 | 0 | 0 | 0 |
| 108 | c | 1 | 1 | 1 | 0 | 0 | 0 | 0 | 0 | 1 | 1 | 1 | 0 |
| | d | 0 | 0 | 0 | 0 | 1 | 0 | 0 | 0 | 0 | 0 | 0 | 1 |
| | e | 0 | 0 | 0 | 0 | 0 | 1 | 0 | 0 | 0 | 0 | 0 | 0 |
| | f | 1 | 1 | 1 | 0 | 1 | 1 | 1 | 1 | 1 | 1 | 1 | 1 |
| | g | 0 | 0 | 0 | 1 | 0 | 0 | 0 | 0 | 0 | 0 | 0 | 0 |
| 110 | a | 0 | 0 | 0 | 0 | 0 | 0 | 0 | 1 | 0 | 0 | 0 | 0 |
| | b | 0 | 0 | 0 | 0 | 0 | 0 | 0 | 0 | 1 | 0 | 0 | 0 |
| | c | 1 | 1 | 1 | 0 | 0 | 0 | 0 | | 1 | 1 | 1 | 0 |
| | d | 0 | 0 | 0 | 0 | 1 | 0 | 0 | 0 | 0 | 0 | 0 | 1 |
| | e | 0 | 0 | 0 | 0 | 0 | 1 | 0 | 0 | 0 | 0 | 0 | 0 |
| 111 | | 0 | 1 | 1 | 0 | 0 | 0 | 0 | 0 | 1 | 1 | 0 | 0 |
| 112 | | 0 | 1 | 1 | 0 | 0 | 0 | 0 | 0 | 1 | 0 | 0 | 0 |
| 113A | | 0 | 0 | 0 | 0 | 0 | 0 | 0 | 0 | 0 | 1 | 0 | 0 |
| 113 | | 0 | 0 | 0 | 0 | 0 | 0 | 0 | 0 | 0 | 0 | 1 | 0 |

STEP A

All of the lines are in the logical 0 or OFF state except lines 106, 108c, 108f and 110c. It will be recalled that line 106 is connected to terminal $\bar{F}$ of synchronous shift register 76 which, in its reset or OFF state provides a logical 1 output, and in its switched ON state provides a logical 0 output for operation of reader 24. The tape will be its T-03, OPERATION 1, position at reader 24 which will provide logical 1 inputs to lines 108c, 108f and 110c wherefore lamp 29p will be lighted for the T-03 position.

STEP B

Switch 30c, FIG. 6a, pursuant to the T-03 tool selection is depressed momentarily whereupon lines 100c and 101 are momentarily at logical 1 state and lines 102c and 103 are set in the logical 1 state by their respective flip-flops 48 and 56, FIG. 6a. Lines 106, 108c, 108f and 110c remain in the logical 1 state, and all other lines remain in the logical 0 state. Lamp 29s representing the T-03 selection is now lighted on panel 28, FIG. 3. A comparison is made at the T-03 AND gate 68 whereupon a logical 1 output appears on line 111 input to AND gate 79 of register 77. Register 77 is set, both inputs 106 and 111 to AND gate 77 being at logical 1. The logical 1 stop signal appears on line 112. The tape, however, is already stopped.

STEP C

Line 103 having been set in the logical 1 state, step B, it unclamps shift register 76 of tape reader control 75 so that when a clock pulse is received thereby via line 104 after scan switch 32 has been depressed momentarily, register 76 is switched to its ON state whereupon a logical 0 input to line 106 provides for operation of tape reader 24. Thus, at the start of the scanning, lines 102c, 103, 108c, 108f, 110c, 111 and 112 remain in their 1 state; line 105 is momentarily in the 1 state; and all other lines are in the 0 state.

STEP D

Upon initial movement of the tape line 108g is momentarily in the 1 state to reset tape stop control register 77 to restore line 112 to 0 state and to reset T–03 position register whereupon its T–03 position lamp 29p is extinguished and the associated lines 110c and 111 are restored to 0 state. In summary, step D leaves stored lines 102c and 103 in the 1 state; tape supplied line 108g momentarily in the 1 state; and all other lines in the 0 state. Scanning of the tape continues.

STEP E

Reader 24 now reads a T–04 program code identification and supplies 1 thereto via line 108d to synchronous shift register 89 and also supplies thereto via line 108f a gating signal 1 to gate the input on line 108d, thereby to switch register 89 to its ON state whereupon the T–04 position lamp 29p is lighted and logical 1 input appears on line 110d. Input line 102d, however, is in the logical 0 state and no comparison occurs at comparator 65. In summary, step E leaves stored lines 102c and 103 in the 1 state; tape supplied lines 108d and f momentarily in the 1 state; set line 110d momentarily in the 1 state; and all other lines in the 0 state.

STEP F

Scanning of the tape continues. The T–05 code identification now appears at reader 24 and supplies a 1 input via line 108e to synchronous shift register 90 and also supplies thereto via line 108f a gating signal input 1 to gate the input on line 108e, thereby to switch register 90 to its ON state whereupon the T–05 position lamp 29p is lighted on panel 28, FIG. 3, and logical 1 input appears on line 110e. Input line 102e, however, is in the logical 0 state and no comparison occurs at comparator 65. In summary, step F leaves stored lines 102c and 103 in the 1 state; tape supplied lines 108e and f momentarily in the 1 state; register set line 110e momentarily in the 1 state; and all other lines in the 0 state.

STEP G

The reader continues to scan the tape. Reader 24 now reads a T–01 program code identification for operation 2 whereupon an input 1 on line 108a is gated into synchronous shift register 86 by input 1 on line 108f. Register 86 is thereby switched to its ON state, lamp 29p for the T–01 code is lighted, and a logical 1 input is supplied via line 110a to comparator 65. No comparison is made, however, because line 102a is in the 0 state. Logical 1 input on line 110a, FIGS. 5 and 6b, is also supplied to AND gate 80 of register 76 of tape reader control 75. This input resets register 76, when an input pulse on line 104 is received from clock 95, to thus supply a logical 1 input on line 106 to AND gate 79. In summary, step G leaves stored lines 102c and 103 in the 1 state; reset register line 106 in the 1 state; tape supplied lines 108a and f momentarily in the 1 state; register set line 110a momentarily in the 1 state; and all other lines in 0 state.

STEP H

Scanning continues. Register 76 remains reset to provide logical 1 input on line 106. Reader 24 now reads the code identification for the T–02 program for operation 2. Whereupon an input 1 on line 108b is gated into synchronous shift register 87 via input 1 on line 108f. Register 87 is thereby set, lamp 29p for the T–02 code is lighted, and a logical 1 input is supplied via line 110b to comparator 65. No comparison is made, however, because line 402b is in the 0 state. In summary, step H leaves stored lines 102c and 103 in the 1 state; reset register line 106 in the 1 state, tape supplied lines 108b and f momentarily in the 1 state; line 110b momentarily in the 1 state; and all other lines in the 0 state.

STEP I

Scanning continues. Reader 24 now reads the code identification for the T–03 program desired for machining workpiece W in its second operation with the selected T–03 cutter. An input 1 on line 108c is now gated into synchronous shift register 88 of position storage bank 85 by input 1 on line 108f. REgister 88 is thereby switched to its ON state and its T–03 lamp 29p is lighted as logical 1 input appears on line 110c. The input on line 110c to AND gate 68 of comparator 65 now compares with the logical 1 input supplied thereto on input line 102c whereupon AND gate 68 becomes conductive and a 1 input also appears on input line 111 to AND gate 79 of register 77 of tape reader control 75. A logical 1 input already appears on the other input 106 to AND gate 79 whereupon register 77, when a clock pulse is received thereby on line 104, is switched to its ON state to supply a logical 1 input via line 112 to half further scanning of reader 24. This input 1 is also supplied via line 112 to the NC machine controls 21 to qualify starting of the automatic cycle. In summary, step I leaves stored lines 102c and 110c in the 1 state whereby the T–03 switch selection and program position indicator lamps 29s and 29p both remain lighted on panel 28, FIG. 3, thus indicating that the automatic program selection operation has been completed. Lines 103 and 106 remain in their logical 1 state. Tape supplied lines 108c and f are in the logical 1 state. Lines 111 and 112 are in the logical 1 state. All other lines remain at logical 0. The tape is stopped and the numerical control machine is qualified for auto cycle operation to machine workpiece W in its second operation by program T–03 using a T–03 cutter.

STEP J

When the automatic cycle is started by the operator, a logic 1 input on line 113A, FIGS. 5, 6a and 6b, is passed by OR gate 82 and AND gate 81 to reset register 77 whereupon its tape stop line 112 is restored to 0 state. Lines 102c, 103, 108c, 108f, 106, 110c and 111 remain in the 1 state. All other lines are in the 0 state.

STEP K

At the completion of the OPERATION 2 machining on program T–03, the tape supplied clear memory code produces a logical 1 signal on line 113, FIGS. 5 and 6a and b, to flip-flop 48 of selection storage bank 45 to reset register 48 whereupon the associated T–03 switch select indicator lamp 29s is extinguished as logic 0 state is returned to line 102c. Input 1 on line 113 also resets flip-flop 56 of ready register 55 whereupon logic 0 state is restored to line 103. In summary, step K leaves lines 108c and f and 110c at logical 1 state whereby the T–03 position indicator lamp 29p remains lighted, thereby indicating that the T–03 program for operation is in position at reader 24. Register 76 of tape reader control 75 being in its OFF state, line 106 remains at logic 1. The auto clear signal being momentarily supplied, line 113 is shown in step K of the logic chart as being at logical 1 state. All other lines are in the logical 0 state.

STEP A

At the completion of the T–03 program for operation 2, its T–04 program will be in position at reader 24, thereby indicating to the operator that operation 2 has been completed using a T–03 program. Lines 106, 108d, 108f and 110d will be in the 1 state. The fact that the T–04 program is now in position at the reader will be indicated by the T–04 position lamp 29p which will now be lighted.

In summary, there are four basic parts to the control system associated with the cutter compensated program of the present invention. These are: (1) tool selection memory and indicators; (2) program identification detection, memory, and indication; (3) comparison logic; and (4) control functions.

The tool selection section consists of memory elements such as flip/flops. There is one memory unit for each variation of tool size. Remote switches provide the machine operator with a means of indicating to the system the size cutter available. This selection is stored and an indicator light provides visual reference of the selection made.

Operation of any of the tool selection switches will set a control memory device that will permit the scanning process to begin, on request, that is, on operation of the scan switch. Unless a selection has been made, no automatic operation is permited. The on-off switch has been provided to bypass this interlock to allow tapes not coded for this format to be used. On operation of the scan switch, the tape reader is started. The identifying codes of each operation are detected, decoded, and stored in memory units. As each new identification is read in, the previous memory is erased. Only one memory unit is active at any given time. The activated memory unit indicates which operation code is currently passing the reading head.

At the start of the scan operation, all codes are read and stored briefly but otherwise ignored. When a T–01 code is detected, the system is alerted that a new "family" of operations is in position to be scanned (i.e., a "page" has been turned).

The comparison logic is now activated and each identification code will be compared to the selected tool code as soon as it is read. On detecting a comparison, the reader is stopped with the dimensional part of the operation in position on the tape deck for reading. A signal is sent to the main control system to qualify the automatic cycle start.

At the end of the automatic cycle, the selected tool memory is cleared. This prohibits start of a subsequent automatic cycle until a new selection has been made.

From the foregoing it will now be apparent that a cutter compensated system and method has been provided which is well adapted to serve the purposes of the present invention. It will be understood, moreover, that whereas a single magnetic tape has been disclosed and is preferred for use as the data recording medium, that the practice of the invention is not limited thereto, and that other media such, for example, as disc, drum, punched cards, and punched tape media may be used. It will be understood, furthermore, that although electronic digital circuits have been disclosed and are preferred, that other logic methods such, for example, as fluidics could be used to provide satisfactory performance.

It will thus be apparent that the cutter compensated numerically controlled machining method of the present invention generally comprises the steps of programming and sequentially recording on a data recording medium all of the programs for all of the operations to be performed on a workpiece including for each operation a family of tool code identified programs corresponding respectively to a correspondingly tool coded family of full and undersize cutters, and preparatory to performing each operation, scanning the medium to position at a data reader that program having a tool code identification which matches the tool code identification of the tool selected to perform the operation. It will be apparent, moreover, that such method is further cardinally characterized by the secondary step of preventing the stopping of the scanning operation, notwithstanding that a program-cutter match may have been made, until the first of each successive family of programs has been read and identified.

What is claimed and desired to be secured by Letters Patent of the United States is:

1. The cutter compensated method of numerical control (NC) machining of a workpiece which comprises the steps of:
   programming and sequentially recording in uninterrupted sequence on a single recording medium all of the programs for performing all of the machining operations on the workpiece and including for each of said operations a family of sequentially recorded programs corresponding respectively to a family of full and under size cutters;
   selecting from the family of cutters for each operation an available cutter for performing that operation;
   scanning said recording medium with respect to an NC reader to select and position at the reader for each of said operations that recorded program which corresponds to said available cutter for NC machining of that operation;
   reading each of said selected program; and
   NC machining the workpiece with instructions read from each of said selected program and with the selected cutter corresponding thereto.

2. The method as in claim 1 wherein the recording medium is a single tape and the tape, for each operation, is scanned with respect to the NC reader to position the selected program at the reader.

3. The method as in claim 2 wherein the various cutter sizes and corresponding programs have T-code designations: T–01, full size, and T–02 to T–05, undersize, and the T-code identifications for the programs are recorded on the tape.

4. The method as in claim 3 wherein all of the families of cutters and corresponding programs have the same T-code designations for their respective cutters and programs.

5. The method as in claim 4 wherein a T-code preselection starts the scanning of the tape and stops the scanning when the recorded code identification of the preselected program for the next succeeding operation appears at the NC reader.

6. The method as in claim 5 wherein stopping of the tape is prevented when the same T-code identification for the preceding operation appears at the NC reader.

7. The method as in claim 5 wherein the T-code preselection is stored and visually indicated, the appearance of the recorded T-code identification at the NC reader is stored and visually indicated, the stored T-code preselection and appearance are compared, and the tape is stopped when a comparison is made.

8. The method as in claim 7 wherein the storing and visual indication of a reader detected T-code identification are discontinued when a comparison is not made.

9. The method as in claim 5 wherein scanning of the tape is prevented until said preselection is made.

10. The method as in claim 7 wherein the stopping of the tape qualifies starting of the NC machining from the selected program and with the selected cutter.

11. The method as in claim 10 wherein the stored and visually indicated preselection and appearance of the selected program are continued during the NC machining of each operation.

12. The method as in claim 11 wherein the stored and visual indications of the selected T-code program are discontinued when its corresponding operation is completed.

13. The method as in claim 12 wherein discontinuance of the storing and indicating of the program preselection is controlled by tape recorded signals.

14. The method as in claim 12 wherein positioning at the NC reader of the next succeeding program is stored and visually indicated, thereby identifying the program used for the completed operation.

15. In a system of cutter compensated numerical control (NC) machining of a workpiece, the combination of:
 a recording medium having sequentially recorded thereon for directing a sequence of operations to be performed on the workpiece, and having all of the programs of a plurality of families of programs recorded in an uninterrupted sequence thereon;
 a plurality of families of full and undersize cutters respectively corresponding to said families of programs, there being a program in each family of programs for each cutter size in each family of cutter sizes;
 an NC reader; and
 means for positioning at the NC reader that one of said recorded programs which matches an available one of said cutters selected to perform one of said operations on the workpiece.

16. A system as in claim 15 wherein each recording medium is a single tape and said program positioning means comprises means for positioning the tape to selectively present the programs recorded thereon to said NC reader in sequential order.

17. A system as in claim 16 wherein each family of cutters comprises a full sized cutter having a T-code identification T-01 and undersized cutters respectively having T-code identifications T-02, T-03, T-04 and T-05, and wherein said matching cutters and programs have the same T-code identifications and said T-code identifications and dimensional instructions for each of the program are recorded on the tape.

18. A system as in claim 17 wherein said tape positioning means comprises means for scanning the tape with respect to the reader and logic circuitry for stopping the scanning when the matching program is positioned at the reader.

19. A system as in claim 18 wherein said logic circuitry includes means for registering and storing cutter signals indicative of the T-code identifications of the cutters selected to perform the respective operations on the workpiece, and means for preventing the scanning of the tape until a cutter selection has been registered and stored.

20. A system as in claim 19 wherein said logic circuitry includes means for visually indicating and storing T-code program signals indicative of the successive appearance at the reader of the sequentially recorded programs, comparator means for comparing the stored cutter and program signals, and means for stopping the tape when a comparison is made by the comparator means.

21. A system as in claim 20, said logic circuitry including means for preventing said stopping of the tape until the code identification of the first recorded program of each family of programs has appeared at the reader.

22. A system as in claim 20 and including NC control means for machining the workpiece in response to taped dimensional information constituting the selected program, said NC control means being qualified for operation by a signal received from said tape stopping means when the tape is stopped and said tape stopping means being rendered ineffective to stop the tape by a signal received from said NC control means when the same is set into operation.

23. A system as in claim 19 wherein said cutter registering and storing means includes switch means selectively actuable by the machine operator to register a selection of a particular cutter, storage means for storing the signal indicative of that selection, and visual means for visually indicating that selection.

24. A system as in claim 22 wherein said logic circuitry includes means for maintaining the visual indications of the selected tool and matching program during the machining of the workpiece under control of said NC machine controls.

* * * * *